H. G. KNODERER.
CONDUIT BODY ANGLE ADAPTER.
APPLICATION FILED OCT. 18, 1920.

1,386,877.

Patented Aug. 9, 1921.

Inventor:
Homer G. Knoderer,
by *Alben G. Davis*
His Attorney.

UNITED STATES PATENT OFFICE.

HOMER G. KNODERER, OF ENGLEWOOD, NEW JERSEY, ASSIGNOR TO GENERAL ELECTRIC COMPANY, A CORPORATION OF NEW YORK.

CONDUIT-BODY ANGLE-ADAPTER.

1,386,877.  Specification of Letters Patent.  Patented Aug. 9, 1921.

Application filed October 18, 1920. Serial No. 417,642.

*To all whom it may concern:*

Be it known that I, HOMER G. KNODERER, a citizen of the United States, residing at Englewood, county of Bergen, State of New Jersey, have invented certain new and useful Improvements in Conduit-Body Angle-Adapters, of which the following is a specification.

My invention relates to angle adapters for conduit bodies or outlet boxes and an object of my invention is to provide a simple and rugged device which may be cheaply manufactured.

In order to lessen the expense of conduit work it is desirable to reduce the number of parts to be carried in stock as much as possible and in order to avoid the necessity of providing a different type of box for each wiring device it has been proposed to supply a plurality of interchangeable covers for outlet boxes, each cover being designed to mount a standard type of wiring device.

In many cases it is desirable to mount the fixtures at an angle to the plane of the wall on which the outlet box may be mounted, as, for example, where electric lamps are mounted on the covers of the outlet boxes and it is desired to provide these lamps with reflectors which direct the light in a general downward direction.

According to my invention an angle adapter is provided which may be mounted upon the outlet box and which is provided with means for securing thereto the covers which are ordinarily secured directly to the outlet boxes.

My invention will be better understood from the following description taken in connection with the accompanying drawing, and its scope will be pointed out in the appended claims.

Figure 1:
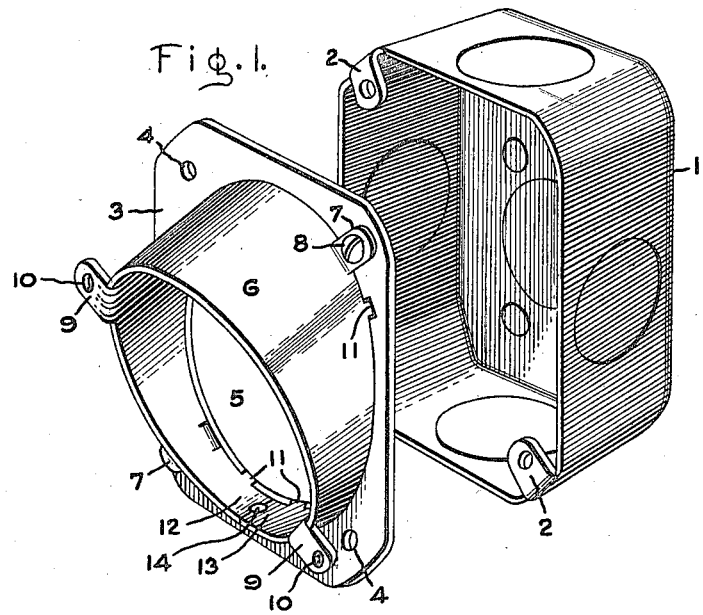
Figure 2:
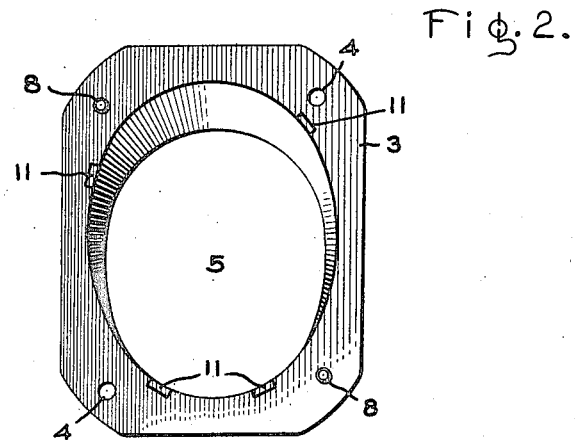

In the accompanying drawing, Figure 1 is a perspective view of the angle adapter and an outlet box to which it is adapted to be secured, while Fig. 2 is a view taken from the bottom side of the angle adapter.

Referring to the drawing, an outlet box 1 is shown provided with lugs 2 which are threaded to receive screws for securing a cover of any desired type to the box. My angle adapter comprises a plate 3 of the same size and shape as the ordinary box cover and this plate is provided with holes 4 through which screws may be passed to engage the lugs 2 and secure the adapter to the outlet box. A central opening 5 is provided in the plate 3 for providing access to the conductors in the outlet box. This opening is shown as elliptical and is nearly as great in area as the outlet box to provide ready access thereto. A hollow cylindrical member 6 having its bases in planes making an acute angle to each other is secured to the cover plate 3 with the opening therein coincident with the opening in the cover plate. I preferably arrange the bases in planes making substantially equal angles with a plane perpendicular to the axis of the cylindrical member in order that the two openings may be substantially the same in shape and area. One base of the cylindrical member 6 is provided with a plurality of lugs 7 in the plane of the base, which lugs are adapted to be secured to the cover plate 3, as, for example, by screws 8. The other base of the cylindrical member 6 is provided with a plurality of lugs 9 in the plane thereof provided with threaded openings 10 therein, and the distance between these threaded openings 10 is the same as the distance between the openings in the lugs 2 of the outlet box whereby any cover designed to fit the outlet box may be mounted on the adapter. In this way, any standard cover may be mounted in angular relation with respect to the outlet box and the wall upon which the box is mounted. In order to assist in mounting the cylindrical member 6 firmly in place upon the member 3 I provide a plurality of projections 11 on the cylindrical member and provide corresponding notches in the cover plate 3 located so as to engage these projections.

In order to manufacture the hollow cylindrical members 6 rapidly and cheaply, I stamp these members from a sheet of material and then roll the blanks to cause the ends 12 and 13 to abut, after which the members may be rapidly welded on a spot welding machine by making a single spot weld upon the line joining the ends 12 and 13. This spot weld, which is indicated at 14, causes these ends to be firmly welded together. The lugs 7 and 9 are then bent into the planes of the respective bases of the cylindrical member.

What I claim as new and desire to secure by Letters Patent of the United States, is,—

1. An angle adapter for outlet boxes comprising a cover plate having an opening therein for providing access to the outlet box and having means for securing the same to the outlet box, a hollow cylindrical member having its bases in planes making an acute angle with each other and provided with means for securing one of said bases to said cover plate with the opening in the cylindrical member coincident with the opening in the cover plate, and means on the other base of said cylindrical member adapted to secure a cover plate thereto.

2. An angle adapter for outlet boxes comprising a cover plate having an opening therein for providing access to the outlet box and having means for securing the same to the outlet box, a hollow cylindrical member having its bases in planes making an acute angle with each other, said member being provided with a plurality of lugs in the plane of one base for securing the member to said cover plate, the wall of the opening in the cover plate being provided with a plurality of notches and the base of the cylindrical member being provided with a plurality of projections arranged to engage said notches to assist in mounting the cylindrical member firmly in place with the opening therein coincident with the opening in the cover plate.

In witness whereof, I have hereunto set my hand this thirtieth day of September, 1920.

HOMER G. KNODERER.